(12) United States Patent
Arevalo

(10) Patent No.: US 11,573,139 B2
(45) Date of Patent: Feb. 7, 2023

(54) ESTIMATION OF DOWNHOLE TORQUE BASED ON DIRECTIONAL MEASUREMENTS

(71) Applicant: Pedro Arevalo, Lower Saxony (DE)

(72) Inventor: Pedro Arevalo, Lower Saxony (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 462 days.

(21) Appl. No.: 16/542,520

(22) Filed: Aug. 16, 2019

(65) Prior Publication Data

US 2021/0048357 A1   Feb. 18, 2021

(51) Int. Cl.
*G01L 5/00* (2006.01)
*E21B 47/024* (2006.01)
*E21B 7/04* (2006.01)

(52) U.S. Cl.
CPC .............. *G01L 5/00* (2013.01); *E21B 47/024* (2013.01); *E21B 7/04* (2013.01)

(58) Field of Classification Search
CPC . G01L 5/00; E21B 47/024; E21B 7/04; E21B 44/04; E21B 47/007; E21B 7/067
USPC .................................................... 73/152.484
See application file for complete search history.

(56) References Cited

U.S. PATENT DOCUMENTS

| 4,351,027 | A | 9/1982 | Gay et al. |
| 7,195,062 | B2 | 3/2007 | Cairns et al. |
| 9,429,008 | B2 | 8/2016 | Beylotte |
| 2007/0030007 | A1* | 2/2007 | Moore ................... E21B 47/024 324/333 |
| 2013/0092439 | A1 | 4/2013 | Mauldin et al. |
| 2014/0262514 | A1* | 9/2014 | Beylotte ................. E21B 44/00 175/40 |
| 2015/0167392 | A1 | 6/2015 | Sugiura |
| 2016/0281490 | A1* | 9/2016 | Samuel ..................... E21B 7/04 |

FOREIGN PATENT DOCUMENTS

WO   WO-2018063543 A1 *  4/2018  ............. E21B 44/00

OTHER PUBLICATIONS

International Search Report and Written Opinion for International Application No. PCT/US2020/046067; International Filing Date Aug. 13, 2020; dated Nov. 27, 2020 (pp. 1-10).

* cited by examiner

*Primary Examiner* — Douglas X Rodriguez
*Assistant Examiner* — Byung Ro Lee
(74) *Attorney, Agent, or Firm* — Cantor Colburn LLP

(57) ABSTRACT

A method of estimating torque includes disposing at least one measurement assembly at a downhole component, the at least one measurement assembly including a first set of directional sensors disposed at a first axial location along the downhole component, and a second set of directional sensors disposed at a second axial location along the downhole component. The method also includes collecting directional measurement data from the first set of directional sensors and the second set of directional sensors during rotation of the downhole component, and estimating, by a processing device, an amount of torque on the downhole component based on the directional measurement data.

20 Claims, 5 Drawing Sheets

ESTIMATION OF DOWNHOLE TORQUE BASED ON DIRECTIONAL MEASUREMENTS

BACKGROUND

In downhole operations such as drilling, geosteering and measurement-while-drilling (MWD) operations, sensor devices are included with a borehole string that measure various parameters of a formation, borehole and/or downhole components. For example, some drilling systems include downhole torque sensors (disposed on, e.g., a drill collar, drill pipe or MWD tool) to measure the torque distribution of a downhole component. Knowledge of the torque on downhole components can be used to selected and/or adjust various operational parameters, such as rotational rate, weight on bit and others.

SUMMARY

An embodiment of a method of estimating torque includes disposing at least one measurement assembly at a downhole component, the at least one measurement assembly including a first set of directional sensors disposed at a first axial location along the downhole component, and a second set of directional sensors disposed at a second axial location along the downhole component. The method also includes collecting directional measurement data from the first set of directional sensors and the second set of directional sensors during rotation of the downhole component, and estimating, by a processing device, an amount of torque on the downhole component based on the directional measurement data.

An embodiment of a system for estimating torque includes a measurement assembly at a downhole component configured to be disposed in a borehole, the measurement assembly including a first set of directional sensors disposed at a first axial location along the downhole component, and a second set of directional sensors disposed at a second axial location along the downhole component. The system also includes a processing device configured to collect directional measurement data from the first set of directional sensors and the second set of directional sensors during rotation of the downhole component, and estimate an amount of torque on the downhole component based on the directional measurement data.

BRIEF DESCRIPTION OF THE DRAWINGS

The following descriptions should not be considered limiting in any way. With reference to the accompanying drawings, like elements are numbered alike.

DETAILED DESCRIPTION

The systems and methods described herein provide for measurement of torque on a downhole component (referred to as "downhole torque"). An embodiment of a torque estimation system includes a first set of directional sensors at a first axial location along a downhole component (e.g., a downhole tool, a bottomhole assembly, drill pipe, a drill string, etc.), and a second set of directional sensors at a second axial location along the downhole component. The directional sensors include, for example, magnetometers and/or accelerometers. The system includes a processing device configured to estimate torque experienced by the downhole component based on directional measurements or measurement data from the sets of directional sensors. In one embodiment, the torque is estimated based on an angle of torsion derived from the directional measurements In one embodiment, estimation of the torque includes acquiring directional measurements during a non-rotating state of the downhole component, and calculating a static toolface angle (e.g., gravity toolface and/or magnetic toolface) at each axial location. The static toolface angles are compared to estimate a static toolface offset. Estimation of the torque also includes acquiring directional measurements during rotation of the downhole component, calculating a rotating toolface at each axial location, and estimating a rotating toolface offset. The angle of torsion is estimated based on the static and rotating toolface offsets, and the downhole torque is estimated based on the angle of torsion and torsional properties (e.g., geometric properties and mechanical properties) of the downhole component.

Embodiments described herein present a number of advantages and technical effects. For example, the embodiments allow for estimating torque downhole without the need for strain gauges or other torque sensors. In conventional drilling and energy industry systems, downhole torque is estimated based on force measurements captured by a bridge of strain gauges distributed around a drill collar or other component. In some instances, strain gauges or other torque sensors are not available. The embodiments eliminate the need for torque sensors, thereby allowing for torque estimation in a wider variety of energy industry systems as compared to conventional torque estimation systems.

Some downhole components, such as bottomhole assemblies with directional and steering units, may not have available strain sensors but do have directional sensors. The embodiments allow for torque estimation using existing sensors without having to modify or redesign such tools to include strain sensors, or without having to deploy additional tools to estimate torque.

Figure 1:
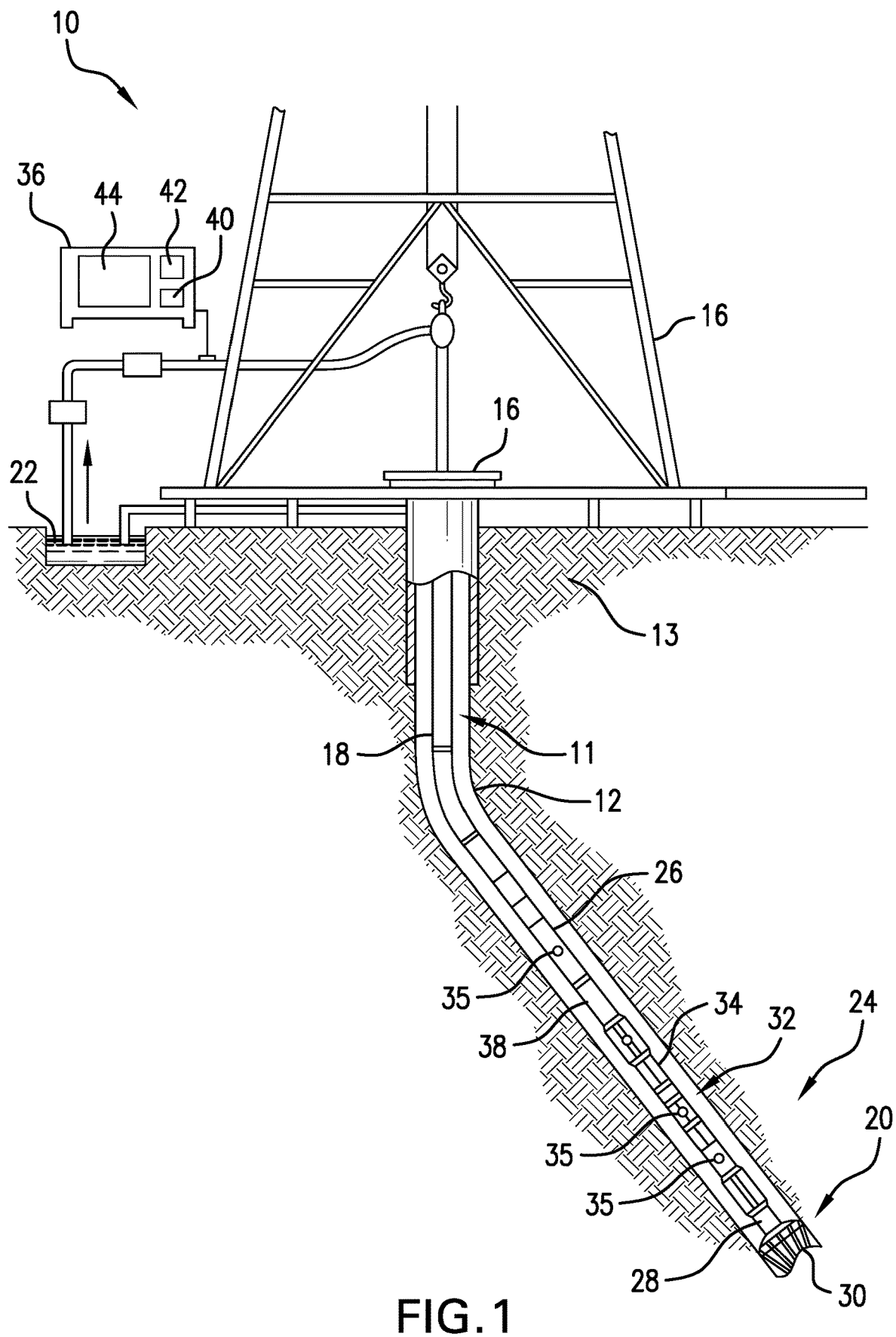
FIG. 1 is a side cross-sectional view of an embodiment of a drilling and/or geosteering system.

Referring to FIG. 1, an exemplary embodiment of a well drilling, logging and/or geosteering system 10 includes a drill string 11 that is shown disposed in a wellbore or borehole 12 that penetrates at least one earth formation 13 during a drilling operation. As described herein, "borehole" or "wellbore" refers to a single hole that makes up all or part of a drilled well. As described herein, "formations" refer to the various features and materials that may be encountered in a subsurface environment and surround the borehole.

In one embodiment, the system 10 includes a conventional derrick 14 that supports a rotary table 16 that is rotated at a desired rotational speed. The drill string 11 includes one or more drill pipe sections 18 that extend downward into the borehole 12 from the rotary table 16, and are connected to a drilling assembly 20. Drilling fluid or drilling mud 22 is pumped through the drill string 11 and/or the borehole 12. The well drilling system 10 also includes a bottomhole assembly (BHA) 24.

The drilling assembly 20 may be rotated from the surface as discussed above, using the rotary table 16 or a top drive, or may be rotated in another manner. For example, a drill motor or mud motor 26 can be coupled to the drilling assembly 20 to rotate the drilling assembly 20.

In one embodiment, the drilling assembly 20 includes a steering assembly 28 connected to a drill bit 30. The steering assembly may be a bent sub steering assembly, a rotary steering assembly or other suitable device or system. The steering assembly 28 can be utilized in geosteering operations to steer the drill bit 30 and the drill string 11 through the formation 13.

In one embodiment, the drilling assembly 20 is included in the bottomhole assembly (BHA) 24, which is disposable within the system 10 at or near the downhole portion of the drill string 11. The system 10 includes any number of downhole tools 32 for various processes including formation drilling, geosteering, and formation evaluation (FE) for measuring versus depth and/or time one or more physical quantities in or around a borehole. The tool 32 may be included in or embodied as a BHA, drill string component or other suitable carrier.

In one embodiment, one or more downhole components, such as the drill string 11, the downhole tool 32, the drilling assembly 20 and the drill bit 30, include sensor devices 34 configured to measure various parameters of the formation and/or borehole. For example, one or more formation parameter sensors 34 (or sensor assemblies such as MWD subs) are configured for formation evaluation measurements and/or other formation parameters of interest (referred to herein as "evaluation parameters") relating to the formation, borehole, geophysical characteristics, borehole fluids and boundary conditions. These sensors 34 may include formation evaluation sensors (e.g., resistivity, dielectric constant, water saturation, porosity, density and permeability), sensors for measuring borehole parameters (e.g., borehole size, and borehole roughness), sensors for measuring geophysical parameters (e.g., acoustic velocity and acoustic travel time), sensors for measuring borehole fluid parameters (e.g., viscosity, density, clarity, rheology, pH level, and gas, oil and water contents), boundary condition sensors, and sensors for measuring physical and chemical properties of the borehole fluid.

The system 10 also includes a directional measurement assembly that includes two or more sets of directional sensors 35 that are located at various axial locations along the drill string 11, the BHA 24 and/or any other downhole component or components. Each set of directional sensors 35 includes one or more directional sensors configured to take directional measurements at corresponding axial locations. A "directional measurement" is a measurement of a parameter or property indicative of, or usable to estimate, a directional property of the downhole component. Examples of directional sensors include magnetometers, accelerometers, gyroscopes and others. Directional measurements are typically utilized in directional drilling operations to estimate directional properties of a downhole component, such as toolface, azimuth and inclination.

In one embodiment, the parameter sensors 34, the sets of directional sensors 35 and/or other downhole components include and/or are configured to communicate with a processor to receive, measure and/or estimate directional and other characteristics of the downhole components, borehole and/or the formation. For example, the sensors 34, sets of directional sensors 35 and/or BHA 24 are equipped with transmission equipment to communicate with a processor such as a surface processing unit 36 and/or a downhole processor 38.

The surface processing unit 36 (and/or the downhole processor 38) may be configured to perform functions such as controlling drilling and steering, controlling the flow rate and pressure of borehole fluid, transmitting and receiving data, processing measurement data, estimating directional properties, estimating downhole torque as discussed further below, and/or monitoring operations of the system 10. The surface processing unit 36, in one embodiment, includes an input/output (I/O) device 40, a processor 42, and a data storage device 44 (e.g., memory, computer-readable media, etc.) for storing data, models and/or computer programs or software that cause the processor to perform aspects of methods and processes described herein.

The directional measurement assembly is part of a torque estimation system that includes a processing device (e.g., the surface processing unit 36 and/or downhole processor 38) configured to acquire or receive directional measurement data. The processing device estimates torque on a downhole component based on directional measurements and mechanical properties of the downhole component.

Figure 2:
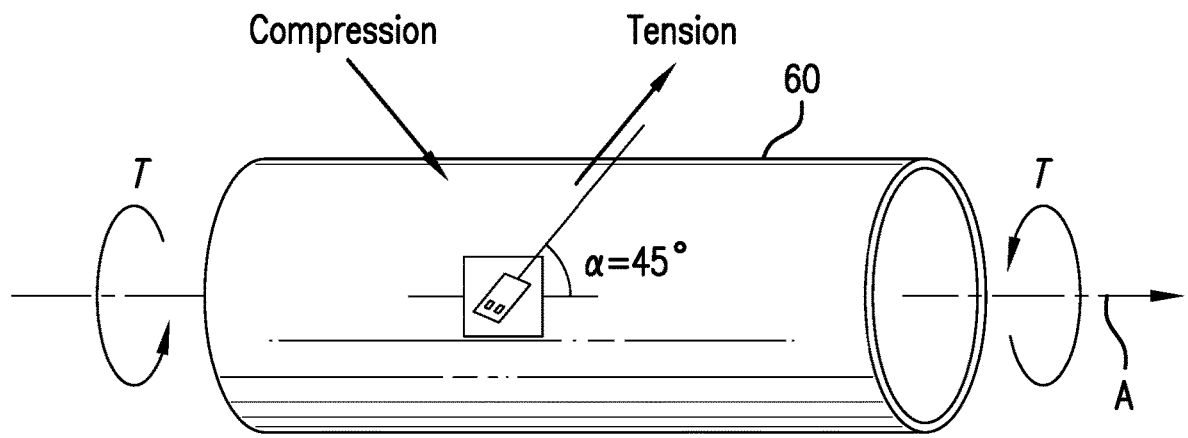
FIG. 2 depicts an example of a downhole component under torsion during rotation.
Figure 3:
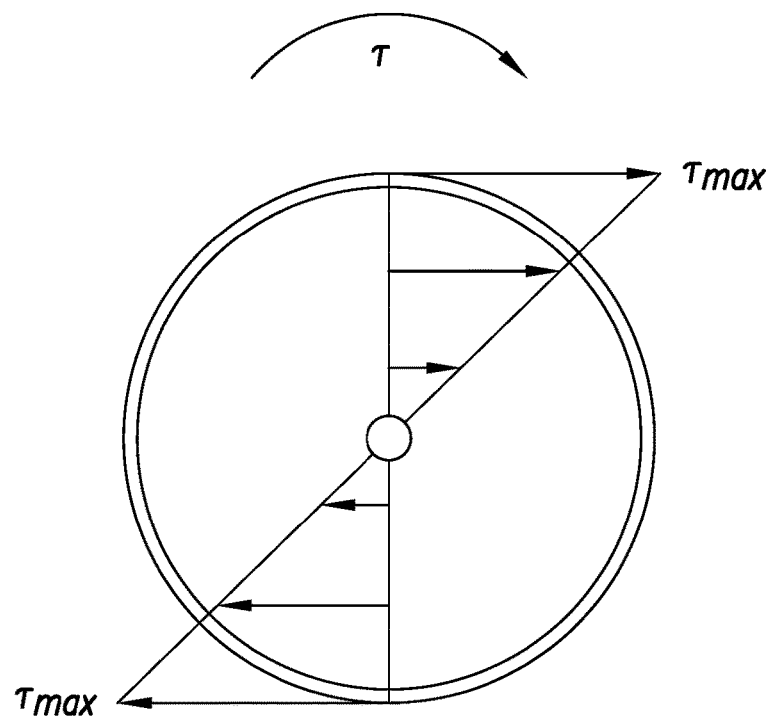
FIG. 3 depicts an example of shear stress distribution at an axial location of the downhole component of FIG. 2.

FIGS. 2 and 3 show an example of a downhole component 60, and torque distribution during drilling. In this example, the downhole component 60 is a tubular such as a drill collar, which has a rotation axis A. It is noted that the downhole component is not limited to this example. As shown in FIG. 2, during rotation, the downhole component 60 is in torsion and experiences torque T in opposing rotational directions. The torque T at a selected axial location is shown in FIG. 3, which illustrates the distribution of torsional shear stress $\tau$. As shown, the magnitude of the shear stress increases radially from zero at the center of the downhole component 60 to a maximum shear stress $\tau_{max}$ at the surface of the downhole component 60. Due to rotation and torsion, directional sensors at different axial locations, which initially have the same orientation (in a plane normal to the component rotational axis), become misaligned, such that their orientations are different. The torque estimation system utilizes this misalignment to estimate torque on the downhole component during rotation.

The torque estimation system utilizes directional measurements taken at different axial locations. The directional measurements are used to calculate the torque at a selected axial location and/or a distribution of torque along an axial length L of a downhole component. An "axial" location refers to a location on a downhole component relative to a longitudinal axis and/or axis of rotation of a component.

In one embodiment, a processing device is configured to determine the difference between the orientation of a first set of directional sensors and the orientation of a second set of directional sensors, which can change over time due to, for example, high frequency changes in the torque downhole. The processing device estimates the downhole torque based on the difference between orientations and one or more mechanical properties of the downhole component.

In one embodiment, the downhole torque is estimated by calculating an angle of torsion between the axial locations. The angle of torsion is then converted to downhole torque using material properties of the downhole component and offset corrections based on the relative orientation of directional sensors along the downhole component and/or string 12.

The torque estimation system can use any of a variety of types of sensors and/or directional measurements. In one embodiment, the sets of directional sensors include accelerometers and/or magnetometers.

Figure 4:
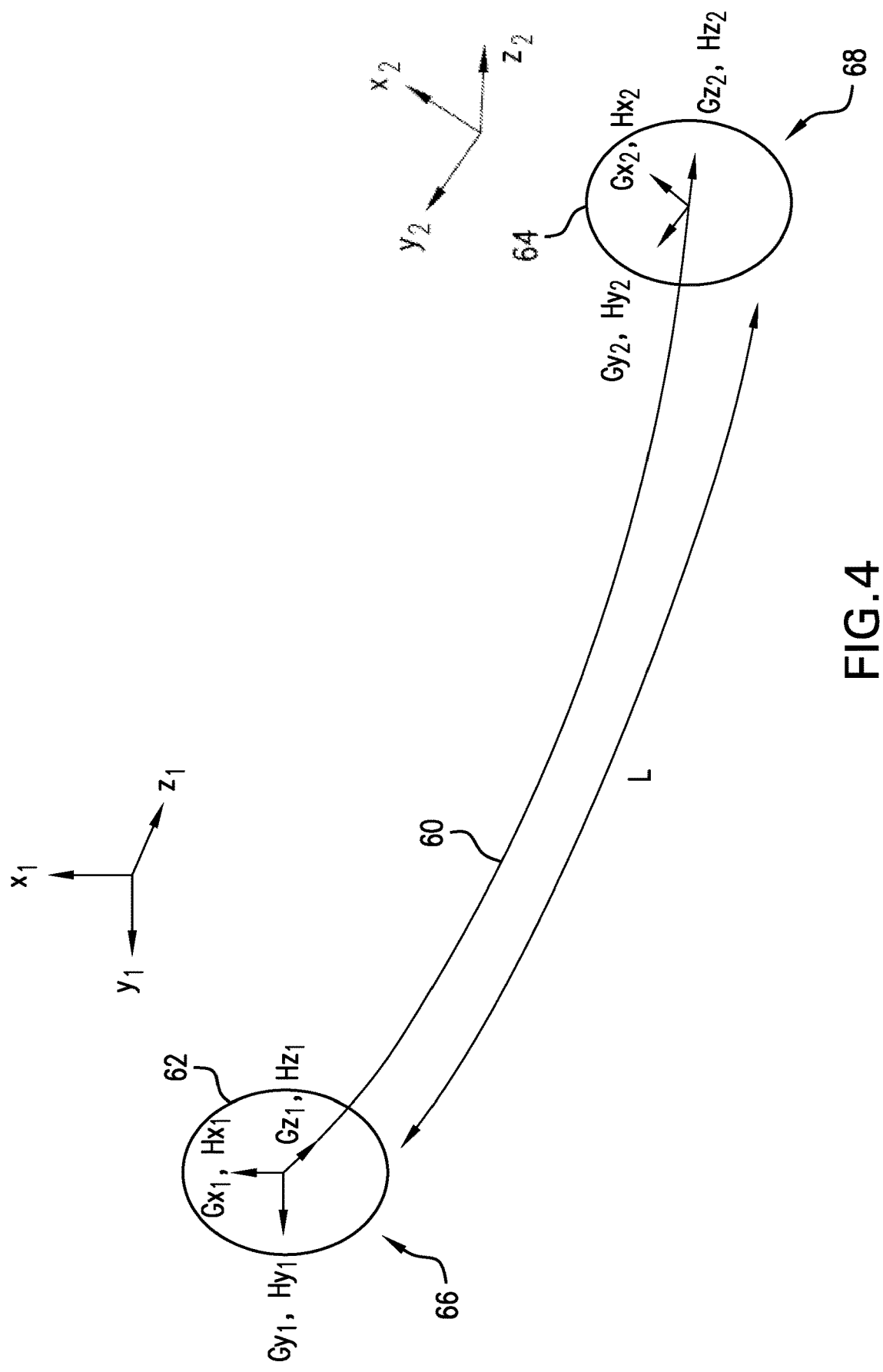
FIG. 4 is a schematic illustration of a torque estimation system including two sets of directional sensors disposed at different axial locations.

Referring to FIG. 4, in one embodiment, the torque estimation system estimates the angle of torsion $\phi$ between a first axial location and a second axial location. FIG. 4 illustrates a section of a downhole component 60 having a length L that extends from a first axial location 62 to a second axial location 64. A set of directional sensors are disposed at each axial location 62 and 64. Each set of directional sensors has an orientation relative to the downhole component longitudinal axis. This orientation is referred to as the "toolface orientation," the "toolface angle" or simply "toolface."

In the embodiment of FIG. 4, two sets of directional sensors are disposed on the downhole component 60. For example, a first set 66 of directional sensors is disposed at the first axial location 62, and a second set 68 of directional sensors is disposed at the second axial location 64. In this embodiment, the first set 66 and the second set 68 each include a three-axis accelerometer and a three-axis magnetometer.

Each set of sensors is configured to take a directional measurement in the directions of three orthogonal axes. For example, the first set 66 includes sensor components oriented along, axes $x_1$, $y_1$ and $z_1$, which define a first coordinate system. Likewise, the second set 68 includes sensor components oriented along axes $x_2$, $y_2$ and $z_2$, which define a second coordinate system. The sets 66 and 68 are separated by the distance L. It is noted that the coordinate systems are specific to each set of sensors, so that rotation of one set relative to the other results in the sets having differently oriented axes.

As shown in FIG. 4, the first set 66 of sensors outputs a first set of measurement data that includes accelerometer measurements Gx1, Gy1, Gz1, and magnetometer measurements Hx1, Hy1, Hz1. The second set of sensors outputs second set of measurement data that includes accelerometer measurements Gx2, Gy2 and Gz2, and magnetometer measurements Hx2, Hy2 and Hz2.

The angle of torsion between the two sensor sets can be derived using Hooke's law for shear according to the following equation:

$$\phi = \frac{TL}{GJ} \quad (1)$$

where $\phi$ is the angle of torsion, T is the torque across the downhole component 60 (in the plane normal to the z-axis), G is the shear modulus and J is the moment of inertia.

For a tubular downhole component such as a drill collar, the moment of inertia J can be calculated according to the following equation:

$$J = \frac{\pi}{64}(d_{out}^4 - d_{in}^4), \quad (2)$$

where $d_{out}$ is the external diameter of the tubular and $d_{in}$ is the internal diameter of the tubular. By combining equations (1) and (2), the following equation for the downhole torque can be derived:

$$T = \frac{\phi G \frac{\pi}{64}(d_{out}^4 - d_{in}^4)}{L}. \quad (3)$$

L is the distance between. the sets 66 and 68, which does not substantially change during rotation. (e.g., during a drilling run). In addition, the internal and external diameters can also be assumed constant for a given component size. Based on the assumptions that the length L and the diameters do not change, the remaining variable in equation (3) is the angle of torsion $\phi$.

Figure 5:
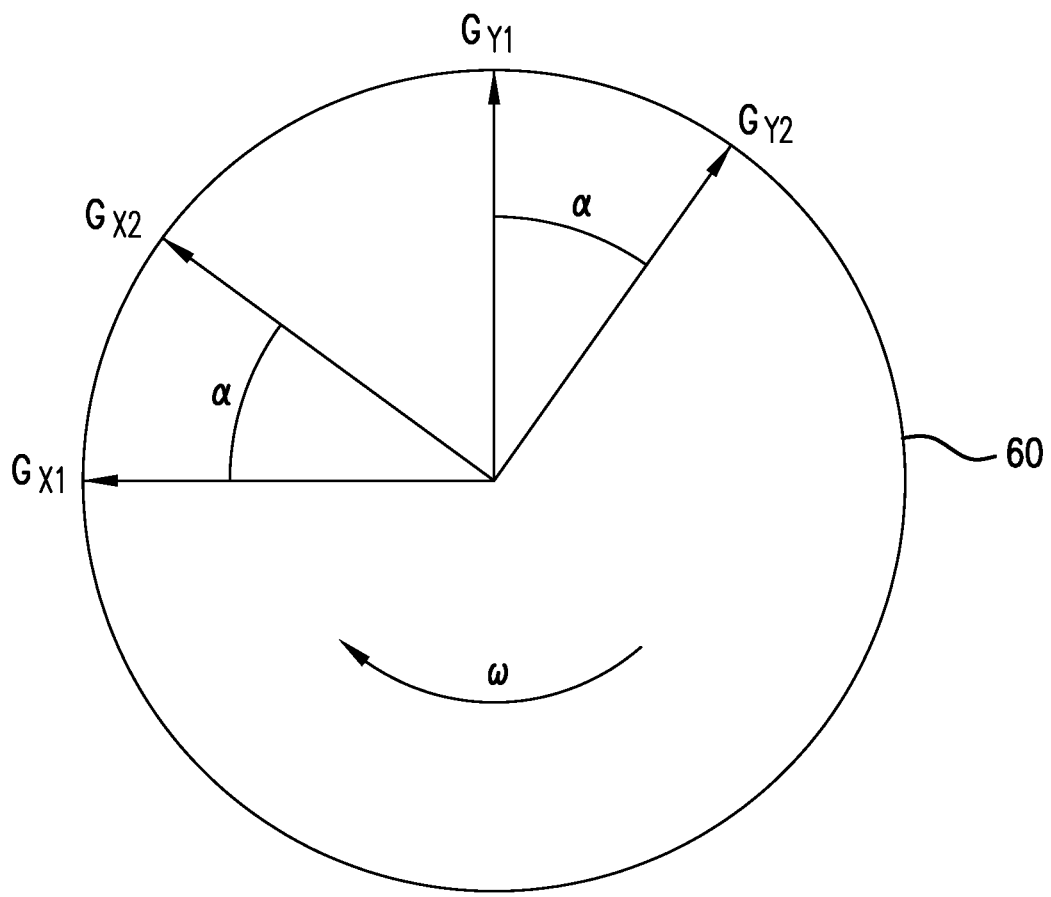
FIG. 5 depicts directional measurements taken by the system of FIG. 4.

Referring to FIG. 5, in one embodiment, the angle of torsion is calculated based on a toolface offset between the sets of sensors. The "toolface offset" refers to an angular difference between the toolface of the first set 66 of sensors and the toolface of the second set 68 of sensors. FIG. 5 is a projection of the first and second axial locations onto single plane to show the relative orientations of directional measurements.

In this example, the first set 66 of sensors generates a measurement Gx1 in the $x_1$ direction and the second set 68 of sensors generates a measurement Gx2 in the $x_2$ direction. The first set 66 of sensors also generates a measurement Gy1 in the $y_1$ direction and the second set 68 of sensors generates a measurement Gy2 in the $y_z$ direction. As shown in FIG. 5, due to torsion, the orientations of the measurements are separated by an angle $\alpha$ that represents the sum of angles of torsion and tool face offset between the sensor sets. The angle $\alpha$ can thus be represented by the following equation:

$$\alpha = \phi + TFO, \quad (4)$$

where TFO stands for tool face offset between the coordinate systems for each sensor set.

The TFO is estimated, in one embodiment, based on the toolface orientation relative to magnetic north, referred to as the "magnetic tool face" (MTF). Alternatively, or in addition to the MTF, the TFO may be estimated based on the toolface orientation relative to the earth's gravitational field, referred to as the "gravity tool face" (GTF). Both MTF and GTF can be used while steering to measure a borehole's orientation at a specific measurement point and plan accordingly.

MTF is typically used for estimating directional properties of a downhole component at low inclinations. For example, MTF is used when the component has an inclination that is less than a threshold of about 5 degrees. On the other hand, for higher inclinations, GTF is typically used.

Using either MTF or GTF, both, the tool face offset (TFO) and the angle of torsion $\phi$ can be determined. In one embodiment, the TFO is calculated based on directional measurements when the downhole component is not rotating (e.g., while taking a survey). This calculated TFO is referred to as "static TFO." The TFO is again calculated based on directional measurements taken during rotation of the downhole component. The TFO estimated for a rotating component is referred to as "rotating TFO" The angle of torsion $\phi$ is estimated based on the static TFO and the rotating TFO, and the downhole torque is estimated based on the angle of torsion $\phi$ and torsional properties (including geometric properties and mechanical properties) of the downhole component.

The TFO may be estimated based on one or more different types of measurements. For example, each set of directional sensors includes an accelerometer and/or magnetometer. Other types of directional measurements, such as gyroscope measurements, may be used. The TFO estimated based on accelerometer measurements is the GTF offset, which is related to orientation relative to high side. The TFO estimated based on magnetometer measurements is the MTF offset, which is related to orientation relative to magnetic north.

For example, if the borehole inclination is less than a threshold value (e.g., 5 degrees), the static TFO can be estimated using magnetometers by calculating a difference between the MTF estimated based on the first set 66 of sensors and the MTF estimated based on the second set 68 of sensors. The static TFO based on MTF can be calculated based on the following equation:

$$TFO = \tan^{-1}(Hx_{Sv1}, Hy_{Sv1}) - \tan^{-1}(Hx_{Sv2}, Hy_{Sv2}) \qquad (5)$$

where $(Hx_{Sv1}, Hy_{Sv1})$ is a measurement point generated by a magnetometer of the first set 66 of sensors (e.g., while taking a survey), which includes a measurement of the magnetic field $(Hx_{Sv1})$ in the $x_1$ direction and a measurement of the magnetic field $(Hx_{Sv1})$ in the $y_1$ direction. $(Hx_{Sv2}, Hy_{Sv2})$ is a measurement point generated by the second set 68 of sensors (e.g., while taking a survey), which includes a measurement of the magnetic field $(Hx_{Sv2})$ in the $x_2$ direction and a measurement of the magnetic field $(Hx_{Sv2})$ in the $y_2$ direction.

If the borehole inclination is greater than a threshold value (e.g., 5 degrees), the TFO can be estimated using accelerometers by calculating a difference between the GTF estimated based on the first set 66 of sensors and the GTF estimated based on the second set 68 of sensors. The static TFO based on GTF can be calculated based on the following equation:

$$TFO = \tan^{-1}(Gx_{Sv1}, Gy_{Sv1}) - \tan^{-1}(Gx_{Sv2}, Gy_{Sv2}) \qquad (6)$$

where $(Gx_{Sv1}, Gy_{Sv1})$ is a measurement point generated by an accelerometer of the first set 66 of sensors (e.g., while taking a survey), which includes an accelerometer measurement $(Gx_{Sv1})$ in the $x_1$ direction and an accelerometer measurement $(Gy_{Sv2})$ in the $y_1$ direction. $(Gx_{Sv2}, Gy_{Sv2})$ is a measurement point that includes an accelerometer measurement $(Gx_{sV2})$ in the $x_2$ direction and an accelerometer measurement $(Gy_{Sv2})$ in the $y_2$ direction.

The angle of torsion ϕ is estimated based on the static TFO and the rotating TFO determined using the first and second sets of sensors during component rotation. In one embodiment, the angle of torsion ϕ is estimated based on a difference between the static TFO and the rotating TFO. For example, the angle of torsion ϕ is estimated using one of the following equations.

$$\phi = \begin{cases} rotMTF_1 - rotMTF_2 - TFO, & inc < 5[deg] \\ rotGTF_1\ rotGTF_2\ TFO, & inc \geq 5[deg] \end{cases} \qquad (7)$$

where rotMTF1 is the rotating MTF estimated based on magnetometer measurements at the first axial location, and rotMTF2 is the rotating MTF estimated based on magnetometer measurements at the second axial location. rotGTF1 is the rotating GTF estimated based on accelerometer measurements at the first axial location, and rotGTF2 is the rotating GTF estimated based on accelerometer measurements at the second axial location.

Rotating toolfaces can be calculated using a variety of approaches. For example, the rotating MTF is estimated based on a magnetometer measurement (Hx, Hy) as follows:

$$rotMTF = \tan^{-1}(Hx, Hy) \qquad (8)$$

In another example, the rotating MTF is estimated using a state estimation algorithm to estimate the internal state of the downhole component. One type of state estimation includes determining phase, for example, by using a Kalman filter.

If the estimation is based on GTF, the angle of torsion can be calculated using a state estimation algorithm, or an algorithm that estimates a GTF corrected using a low-pass filter and an estimated MTF.

Once the static and rotating toolfaces are determined, and the angle of torsion ϕ is estimated, the downhole torque is estimated therefrom. In one embodiment, the torque T is estimated by applying the estimated angle of torsion ϕ to equation (3). For example, if accelerometer measurements are used, the equation (7) for the angle of torsion is inserted into equation (3) as follows:

$$T = \frac{(rotGF_1 - rotGF_2) - \begin{bmatrix} \tan^{-1}(Gx_{Sv1}, Gy_{Sv2}) - \\ \tan^{-1}(Gx_{Sv2}, Gy_{Sv1}) \end{bmatrix} L}{G \frac{\pi}{64}(d_{out}^4 - d_{in}^4)} \qquad (9)$$

The angle of torsion ϕ can be calculated in a variety of ways and is not limited to the specific embodiments and examples discussed above. For example, the angle of torsion ϕ can be determined using a torsional model of a downhole component based on finite element analysis (FEA). The torsional model may be homogeneous, in which the component's outer diameter (OD) and inner diameter (ID) are assumed constant along the length between sensor sets, and is assumed to be homogeneous with respect to its torsional properties.

In another example, the angle of torsion ϕ can be calculated using a heterogeneous model based on FEA that includes multiple portions of a downhole component. The portions may have the same or different torsional properties. By using finite element analysis each element of the downhole component may have individual set of torsional properties, OD, ID and an individual length. The analysis may include generating a matrix of equations for each element. For example, using finite element analysis, equation (1) can be expressed as follows:

$$\phi = \sum_{i=1}^{n} \frac{T_i L_i}{G_i J_i} \qquad (10)$$

where n is a number of elements i, $T_i$ is the torque for an element, $L_i$ is the length of an element, $G_i$ is the shear modulus of the element and $J_i$ is the moment of inertia of the element.

The use of a finer method such as FEA represents a similar procedure as discussed above to estimate downhole torque based on directional measurements. Such as procedure may be able to deliver more accurate results by considering exact characteristics of the downhole component.

Torque may be estimated with varying levels of resolution. Generally, it is desirable to have a high resolution, which is based on the sampling rate of directional measurements. For example, the resolution in degrees of toolface measurements is based on:

$$TFResolution_{deg} = \frac{2\pi f_{sHz}}{maxRotSpeed_{Hz}} * \frac{180}{\pi} \qquad (11)$$

where $f_{sHz}$ is the sampling rate and $maxRotSpeed_{Hz}$ is the maximum rotational speed of the downhole component.

For example, considering a sampling rate of about 10000 Hz and a maximum rotational speed of about 10 Hz, the resultant tool face resolution is about 0.36 degrees. If the sampling rate is reduced to 100 Hz, then the tool face resolution becomes 36 degrees. Therefore, a higher sampling rate favors a higher resolution in the tool face and consequently a higher resolution in the estimation of torque.

Figure 6:
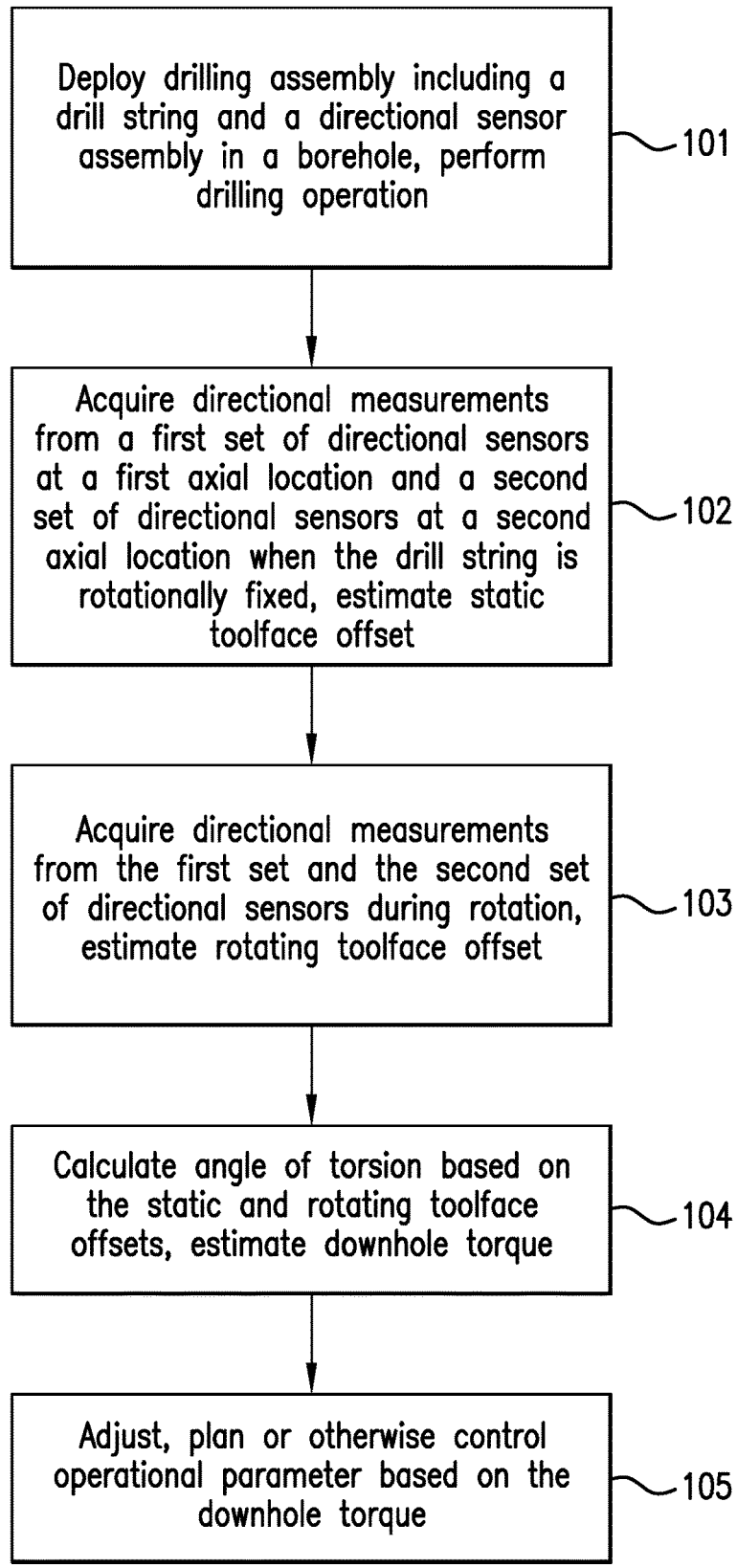
FIG. 6 is a flow chart depicting an embodiment of a method of estimating torque on a downhole component.

FIG. 6 illustrates a method 100 for estimating downhole torque during rotation of a downhole component. The method 100 includes one or more of stages 101-105 described herein, at least portions of which may be performed by a processor (e.g., the surface processing unit 36 and/or downhole processor 38). In one embodiment, the method includes the execution of all of stages 101-105 in the order described. However, certain stages 101-105 may be omitted, stages may be added, or the order of the stages changed.

In the first stage 101, the downhole tool 34, the BHA 24 and/or the drilling assembly 20 are lowered into the borehole 12 during a drilling and/or directional drilling operation. Although the method 100 is described herein as part of a drilling and geo-steering operation, it is not so limited, and may be performed with any desired downhole operation in which torque is a factor (e.g., a wireline operation).

In the second stage 102, directional measurements are taken during a non-rotating phase of the operation. For example, the rotation of the drill string is suspended and directional measurements are taken at a first axial location and at a second axial location. Based on the directional measurements, a static toolface offset is estimated as discussed above. The static toolface offset may be estimated based on magnetometer and/or accelerometer measurements.

In the third stage 103, directional measurements are again taken during rotation of the drilling assembly 20 and/or the drill string 11. For example, as drilling proceeds and the drill string 11 and/or drilling assembly 20 is rotated, directional measurements are taken and used to estimate a rotating toolface at each axial location.

In the fourth stage 104, the angle of torsion between the first and second axial location is calculated based on the static toolface offset and the rotating toolface offset. For example, the angle of torsion is estimated using the equation (7). The downhole torque is then estimated, for example, using equation (3).

Measurements may be taken at any suitable time or during any selected time period. For example, measurements can be taken periodically or continuously (i.e., according to a selected sampling rate) and calculations performed and transmitted in in real time or near real time.

In the fifth stage 105, the torque estimations are used to plan and/or adjust various operational parameters. For example, torque estimation is used to compare surface and downhole torque and/or energy, and compare the surface and downhole torque to determine drilling efficiency. Torque estimation may be used to select and/or adjust various operational parameters, such as weight-on-bit, rotational speed, rate of penetration, direction (e.g., inclination and azimuth during directional drilling). In addition, torque estimation as described herein can be used to plan an operation, for example, by selecting material and geometric properties of downhole components and planned operational parameters.

Set forth below are some embodiments of the foregoing disclosure:

Embodiment 1: A method of estimating torque, comprising: disposing at least one measurement assembly at a downhole component, the at least one measurement assembly including a first set of directional sensors disposed at a first axial location along the downhole component, and a second set of directional sensors disposed at a second axial location along the downhole component; collecting directional measurement data from the first set of directional sensors and the second set of directional sensors during rotation of the downhole component; and estimating, by a processing device, an amount of torque on the downhole component based on the directional measurement data.

Embodiment 2: The method as in any prior embodiment, wherein the first set of directional sensors and the second set of directional sensors each include at least one of a magnetometer and an accelerometer.

Embodiment 3: The method as in any prior embodiment, wherein estimating the amount of torque includes calculating an angle of torsion based on a calculated angle between an orientation of the first set of directional sensors and an orientation of the second set of directional sensors.

Embodiment 4: The method as in any prior embodiment, wherein collecting the directional measurement data includes measuring a first static toolface angle of the first set of directional sensors and a second static toolface angle of the second set of directional sensors when the downhole component is rotationally fixed, and estimating the amount of torque includes calculating a static tool face offset angle based on a difference between the first toolface angle and the second toolface angle.

Embodiment 5: The method as in any prior embodiment, wherein collecting the directional measurement data includes measuring a first rotating toolface angle and a second rotating toolface angle when the downhole component is rotating, and estimating the amount of torque includes calculating a rotating tool face offset angle based on a difference between first rotating toolface angle and the second rotating toolface angle.

Embodiment 6: The method as in any prior embodiment, wherein the angle of torsion is calculated based on the static toolface angle and the rotating toolface angle.

Embodiment 7: The method as in any prior embodiment, wherein the first set of directional sensors and the second set of directional sensors each include a magnetometer, and the static toolface offset angle is a static magnetic toolface angle and the rotating toolface offset angle is a rotating magnetic toolface angle.

Embodiment 8: The method as in any prior embodiment, wherein the first set of directional sensors and the second set of directional sensors each include an accelerometer, and the static toolface offset angle is a static gravity toolface angle and the rotating toolface offset angle is a rotating gravity toolface angle.

Embodiment 9: The method as in any prior embodiment, wherein at least one of the static toolface angle and the rotating toolface angle are calculated based on a torsional model of the downhole component, the torsional model based on properties of the downhole component including geometric properties, moment of inertia and shear modulus.

Embodiment 10: The method as in any prior embodiment, wherein at least one of the static toolface and the rotating toolface are calculated based on a state estimation algorithm.

Embodiment 11: A system for estimating torque, the system comprising: a measurement assembly at a downhole component configured to be disposed in a borehole, the measurement assembly including a first set of directional sensors disposed at a first axial location along the downhole component, and a second set of directional sensors disposed at a second axial location along the downhole component; and a processing device configured to perform: collecting directional measurement data from the first set of directional sensors and the second set of directional sensors during rotation of the downhole component; and estimating an amount of torque on the downhole component based on the directional measurement data.

Embodiment 12: The system as in any prior embodiment, wherein the first set of directional sensors and the second set of directional sensors each include at least one of a magnetometer and an accelerometer.

Embodiment 13: The system as in any prior embodiment, wherein estimating the amount of torque includes calculating an angle of torsion based on a calculated angle between an orientation of the first set of directional sensors and an orientation of the second set of directional sensors.

Embodiment 14: The system as in any prior embodiment, wherein collecting the directional measurement data includes measuring a first static toolface angle of the first set of directional sensors and a second static toolface angle of the second set of directional sensors when the downhole component is rotationally fixed, and estimating the amount of torque includes calculating a static tool face offset angle based on a difference between the first toolface angle and the second toolface angle.

Embodiment 15: The system as in any prior embodiment, wherein collecting the directional measurement data includes measuring a first rotating toolface angle and a second rotating toolface angle when the downhole component is rotating, and estimating the amount of torque includes calculating a rotating tool face offset angle based on a difference between first rotating toolface angle and the second rotating toolface angle.

Embodiment 16: The system as in any prior embodiment, wherein the angle of torsion is calculated based on the static toolface angle and the rotating toolface angle.

Embodiment 17: The system as in any prior embodiment, wherein the first set of directional sensors and the second set of directional sensors each include a magnetometer, and the static toolface offset angle is a static magnetic toolface angle and the rotating toolface offset angle is a rotating magnetic toolface angle.

Embodiment 18: The system as in any prior embodiment, wherein the first set of directional sensors and the second set of directional sensors each include an accelerometer, and the static toolface offset angle is a static gravity toolface angle and the rotating toolface offset angle is a rotating gravity toolface angle.

Embodiment 19: The system as in any prior embodiment, wherein the processing device is configured to calculate at least one of the static toolface angle and the rotating toolface angle based on a torsional model of the downhole component, the torsional model based on properties of the downhole component including geometric properties, moment of inertia and shear modulus.

Embodiment 20: The system as in any prior embodiment, wherein the processing device is configured to calculate at least one of the static toolface angle and the rotating toolface angle based on a state estimation algorithm.

As used herein generation of data in "real time" is taken to mean generation of data at a rate that is useful or adequate for making decisions during or concurrent with processes such as production, experimentation, verification, and other types of surveys or uses as may be opted for by a user. As a non-limiting example, real time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real time" is to be taken in context, and does not necessarily indicate the instantaneous determination of data, or make any other suggestions about the temporal frequency of data collection and determination.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of estimating torque, comprising:
disposing at least one measurement assembly at a downhole component, the at least one measurement assembly including a first set of directional sensors disposed at a first axial location along the downhole component, and a second set of directional sensors disposed at a second axial location along the downhole component;
collecting static directional measurement data from the first set of directional sensors and the second set of directional sensors when the downhole component is deployed downhole and when the downhole component is rotationally fixed, and collecting rotating directional measurement data from the first set of directional sensors and the second set of directional sensors when the downhole component is deployed downhole and during rotation of the downhole component according to a rotational speed;
calculating a static toolface angle at each of the first axial location and the second axial location based on the collected static directional measurement data, and calculating a rotating toolface angle at each of the first axial location and the second axial location based on the collected rotating directional measurement data; and
estimating, by a processing device, an amount of torque on the downhole component based on the calculated static toolface angle at each of the first axial location and the second axial location and the calculated rotating toolface angle at each of the first axial location and the second axial location;
wherein the amount of torque is estimated using a varying resolution of the calculated rotating tool face angle at each of the first axial location and the second axial location, the varying resolution of the calculated rotating tool face angle at each of the first axial location and the second axial location depending on the rotational speed of the rotating downhole component.

2. The method of claim 1, wherein the first set of directional sensors and the second set of directional sensors each include at least one of a magnetometer and an accelerometer.

3. The method of claim 1, wherein estimating the amount of torque includes calculating an angle of torsion based on the calculated static tool face angle at each of the first axial location and the second axial location and the calculated rotating tool face angle at each of the first axial location and the second axial location.

4. The method of claim 3, wherein the angle of torsion is calculated based on a torsional model of the downhole component, the torsional model based on properties of the downhole component including geometric properties, moment of inertia and shear modulus.

5. The method of claim 1, wherein calculating the static toolface angle includes calculating a first static toolface angle of the first set of directional sensors and a second static toolface angle of the second set of directional sensors, and calculating a static tool face offset angle based on a difference between the first static toolface angle and the second static toolface angle.

6. The method of claim 5, wherein calculating the rotating toolface angle includes calculating a first rotating toolface angle of the first set of directional sensors and a second rotating toolface angle of the second set of directional sensors, and calculating a rotating tool face offset angle based on a difference between the first rotating toolface angle and the second rotating toolface angle.

7. The method of claim 6, wherein an angle of torsion is calculated based on the static toolface offset angle and the rotating toolface offset angle.

8. The method of claim 6, wherein the first set of directional sensors and the second set of directional sensors each include a magnetometer, and the static toolface offset angle is a static magnetic toolface offset angle and the rotating toolface offset angle is a rotating magnetic toolface offset angle.

9. The method of claim 6, wherein the first set of directional sensors and the second set of directional sensors each include an accelerometer, and the static toolface offset angle is a static gravity toolface offset angle and the rotating toolface offset angle is a rotating gravity toolface offset angle.

10. The method of claim 6, wherein at least one of the static toolface offset angle and the rotating toolface offset angle are calculated based on a state estimation algorithm.

11. A system for estimating torque, the system comprising:
a measurement assembly at a downhole component configured to be disposed in a borehole, the measurement assembly including a first set of directional sensors disposed at a first axial location along the downhole component, and a second set of directional sensors disposed at a second axial location along the downhole component; and
a processing device configured to perform:
collecting static directional measurement data from the first set of directional sensors and the second set of directional sensors when the downhole component is deployed downhole and when the downhole component is rotationally fixed, and collecting rotating directional measurement data from the first set of directional sensors and the second set of directional sensors when the downhole component is deployed downhole and during rotation of the downhole component according to a rotational speed;
calculating a static toolface angle at each of the first axial location and the second axial location based on the collected static directional measurement data, and calculating a rotating toolface angle at each of the first axial location and the second axial location based on the collected rotating directional measurement data; and
estimating an amount of torque on the downhole component based on the calculated static toolface angle at each of the first axial location and the second axial location and the calculated rotating toolface angle at each of the first axial location and the second axial location;
wherein the amount of torque is estimated based on a varying resolution of the calculated rotating tool face angle at each of the first axial location and the second axial location, the varying resolution of the calculated rotating tool face angle at each of the first axial location and the second axial location depending on the rotational speed of the rotating downhole component.

12. The system of claim 11, wherein the first set of directional sensors and the second set of directional sensors each include at least one of a magnetometer and an accelerometer.

13. The system of claim 11, wherein estimating the amount of torque includes calculating an angle of torsion based on the calculated static tool face angle at each of the first axial location and the second axial location and the calculated rotating tool face angle at each of the first axial location and the second axial location.

14. The system of claim 13, wherein the processing device is configured to calculate the angle of torsion based on a torsional model of the downhole component, the torsional model based on properties of the downhole component including geometric properties, moment of inertia and shear modulus.

15. The system of claim 11, wherein calculating the static toolface angle includes calculating a first static toolface angle of the first set of directional sensors and a second static toolface angle of the second set of directional sensors, and calculating a static tool face offset angle based on a difference between the first static toolface angle and the second static toolface angle.

16. The system of claim 15, wherein calculating the rotating toolface angle includes calculating a first rotating toolface angle of the first set of directional sensors and a second rotating toolface angle of the second set of directional sensors, and calculating a rotating tool face offset angle based on a difference between the first rotating toolface angle and the second rotating toolface angle.

17. The system of claim 16, wherein an angle of torsion is calculated based on the static toolface offset angle and the rotating toolface offset angle.

18. The system of claim 16, wherein the first set of directional sensors and the second set of directional sensors each include a magnetometer, and the static toolface offset angle is a static magnetic toolface offset angle and the rotating toolface offset angle is a rotating magnetic toolface offset angle.

19. The system of claim 16, wherein the first set of directional sensors and the second set of directional sensors each include an accelerometer, and the static toolface offset angle is a static gravity toolface offset angle and the rotating toolface offset angle is a rotating gravity toolface offset angle.

20. The system of claim 16, wherein the processing device is configured to calculate at least one of the static toolface offset angle and the rotating toolface offset angle based on a state estimation algorithm.

* * * * *